United States Patent
Zhou et al.

(10) Patent No.: US 11,604,807 B2
(45) Date of Patent: Mar. 14, 2023

(54) DUAL-ACTIVE DATABASE FOR DATA PROTECTION

(71) Applicant: International Business Machines Corporation, Armonk, NY (US)

(72) Inventors: Xing Jun Zhou, Shanghai (CN); Hong Tao Li, Beijing (CN); Wei Liu, Beijing (CN); Mai Zeng, Beijing (CN); Jing B J Ren, Beijing (CN); Xiao Chen Huang, Beijing (CN); Kang Yong Ying, Beijing (CN); Liang Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 17/205,154

(22) Filed: Mar. 18, 2021

(65) Prior Publication Data

US 2022/0300529 A1    Sep. 22, 2022

(51) Int. Cl.
  *G06F 16/27* (2019.01)
  *G06F 16/23* (2019.01)

(52) U.S. Cl.
  CPC .......... *G06F 16/27* (2019.01); *G06F 16/2365* (2019.01)

(58) Field of Classification Search
  CPC .............................. G06F 16/27; G06F 16/2365
  USPC ........................................................ 707/610
  See application file for complete search history.

(56) References Cited

U.S. PATENT DOCUMENTS

| | | |
|---|---|---|
| 6,820,098 B1 | 11/2004 | Ganesh et al. |
| 6,996,672 B2 | 2/2006 | Lubbers et al. |
| 8,121,978 B2 | 2/2012 | Wiss et al. |
| 9,081,842 B1 | 7/2015 | Natanzon et al. |
| 10,185,503 B1* | 1/2019 | Baruch ............... G06F 11/2074 |
| 2016/0246867 A1 | 8/2016 | Bourbonnais et al. |

OTHER PUBLICATIONS

"Disaster Recovery for Oracle Database", Zero Data Loss Recovery Appliance, Active Data Guard and Oracle GoldenGate, Oracle, Apr. 2015, 13 pages.
Mell et al., "The NIST Definition of Cloud Computing", Recommendations of the National Institute of Standards and Technology, Special Publication 800-145, Sep. 2011, 7 pages.

* cited by examiner

*Primary Examiner* — Michael Pham
(74) *Attorney, Agent, or Firm* — Jeffrey M. Ingalls

(57) ABSTRACT

In an embodiment, a computer-implemented method comprises deploying a dual-active database on a first active database site and a second active database site. The first active database site comprises a first group of disks including a first sub-group of disks and a second sub-group of disks respectively corresponding to a third sub-group of disks and a fourth sub-group of disks included in a second group of disks in the second active database site. The method further comprises storing a first set of database logs on the first sub-group of disks while a second set of database logs is being written on the second sub-group of disks. Contents of the second set of database logs are consistent with contents of the first set of database logs and function as a duplication of the first set of database logs.

17 Claims, 8 Drawing Sheets

DUAL-ACTIVE DATABASE FOR DATA PROTECTION

BACKGROUND

The present disclosure relates to computer technologies, and more specifically, to a method, system and computer program product for dual-active database improved for data protection.

A computer database is a common mechanism for storing data or information on computer systems while it provides easy access to users. For easy management and access for the computer database, a database management system (DBMS) is typically provided as a software/hardware intermediary layer and interface between an actual physical database, for instance, data actually stored on storage devices, and the users of the computer database. DBMS has been upgraded from a centralized mainframe environment to a de-centralized or distributed environment today such as clouds or blockchains. More and more users base their business operations on mission-critical systems which store information on server-based distributed database systems. Dual-active database systems are a common solution for satisfying the business operations based on mission-critical systems. A typical dual-active database system provides the users two sets of data which are consistent with each other, for instance, a local database site and a remote database site which provide the same data/data service to users of credit cards, debit cards or other bank account operations. As a result, the operations of the business are dependent upon the availability of data stored in their databases systems (e.g., a dual-active database system). In accordance with the mission-critical nature of these database systems, the database systems may need to be protected against loss of the data due to software or hardware problems, disasters (e.g., earthquakes, fires, floods, or electrical power loss), or temporary unavailability of database systems resulting from performing system maintenance. Thus, it may be desirable to improve efficiencies and qualities of data protection for database systems.

SUMMARY

According to some embodiments of the present disclosure, there is provided a method, system and computer program product for dual-active database improved for data protection.

According to one embodiment, the present disclosure provides a computer-implemented method. The method comprises deploying a dual-active database on a first active database site and a second active database site. The first active database site comprises a first group of disks including a first sub-group of disks and a second sub-group of disks respectively corresponding to a third sub-group of disks and a fourth sub-group of disks included in a second group of disks in the second active database site. The method further comprises storing a first set of database logs on the first sub-group of disks while a second set of database logs is being written on the second sub-group of disks. Contents of the second set of database logs are consistent with contents of the first set of database logs and function as a duplication of the first set of database logs. The method further comprises synchronizing a third set of database logs on the third sub-group of disks with the first set of database logs on the first sub-group of disks and a fourth set of database logs on the fourth sub-group of disks with the second set of database logs on the second sub-group of disks. The first sub-group of disks and the third sub-group of disks form a first consistency pair and the second sub-group of disks and the fourth sub-group of disks form a second consistency pair in which whole contents respectively stored on sub-group of disks comprised in one of the two consistency pairs are real-time synchronized to keep consistency within an applicable threshold latency time. One of the two consistency pairs maintains to work while another consistency pair stops work.

According to another embodiment a system is provided. The system comprises at least one processing unit and a memory coupled to the at least one processing unit and storing instructions thereon. The instructions, when executed by the at least one processing unit, perform actions which comprise deploying a dual-active database on a first active database site and a second active database site. The first active database site comprises a first group of disks including a first sub-group of disks and a second sub-group of disks respectively corresponding to a third sub-group of disks and a fourth sub-group of disks included in a second group of disks in the second active database site. The actions further comprise storing a first set of database logs on the first sub-group of disks while a second set of database logs is being written on the second sub-group of disks. Contents of the second set of database logs are consistent with contents of the first set of database logs and function as a duplication of the first set of database logs. The actions further comprise synchronizing a third set of database logs on the third sub-group of disks with the first set of database logs on the first sub-group of disks and a fourth set of database logs on the fourth sub-group of disks with the second set of database logs on the second sub-group of disks. The first sub-group of disks and the third sub-group of disks form a first consistency pair and the second sub-group of disks and the fourth sub-group of disks form a second consistency pair in which whole contents respectively stored on sub-group of disks comprised in one of the two consistency pairs are real-time synchronized to keep consistency within an applicable threshold latency time. One of the two consistency pairs maintains to work while another consistency pair stops work.

According to one or more embodiments of the present disclosure, a computer program product is provided. The computer program product comprises a computer readable storage medium having program instructions embodied therewith. The program instructions are executable by an electronic device to cause the electronic device to perform actions which comprise deploying a dual-active database on a first active database site and a second active database site. The first active database site comprises a first group of disks including a first sub-group of disks and a second sub-group of disks respectively corresponding to a third sub-group of disks and a fourth sub-group of disks included in a second group of disks in the second active database site. The actions further comprise storing a first set of database logs on the first sub-group of disks while a second set of database logs is being written on the second sub-group of disks. Contents of the second set of database logs are consistent with contents of the first set of database logs and function as a duplication of the first set of database logs. The actions further comprise synchronizing a third set of database logs on the third sub-group of disks with the first set of database logs on the first sub-group of disks and a fourth set of database logs on the fourth sub-group of disks with the second set of database logs on the second sub-group of disks. The first sub-group of disks and the third sub-group of disks form a first consistency pair and the second sub-group of disks and the fourth sub-group of disks form a second consistency pair in which whole contents respectively stored on sub-group of disks comprised in one of first consistency pair and second consistency pair are real-time synchronized to keep consistency within an applicable threshold latency time. One of first consistency pair and second consistency pair maintains to work while another consistency pair stops work.

It should be noted that the exemplary embodiments are described with reference to different subject-matters. In particular, some embodiments are described with reference to method type claims whereas other embodiments may be described with reference to apparatus, system or computer program product type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus, system or computer program product type claims, is considered as to be described within this document.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

DETAILED DESCRIPTION

Figure 1:
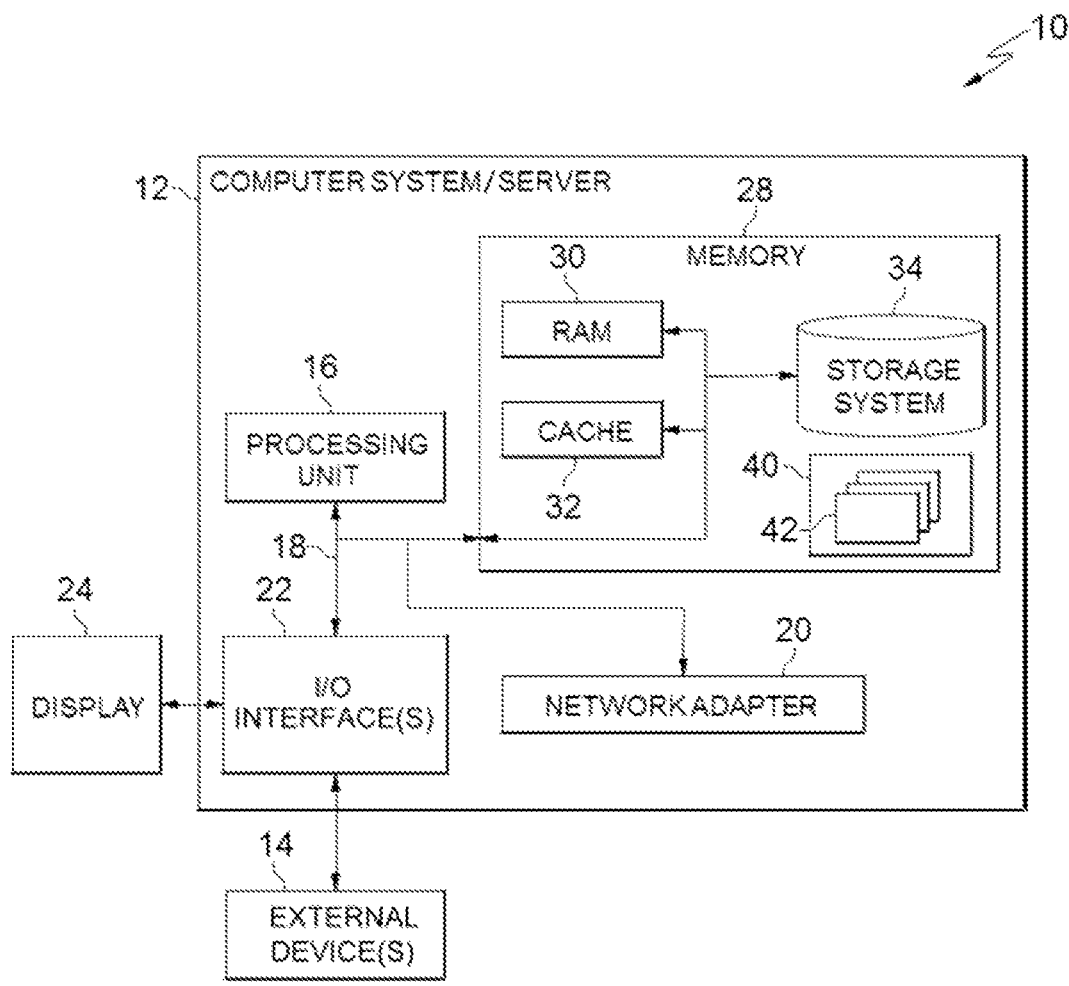
FIG. 1 depicts a cloud computing node according to an embodiment.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are applicable over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities applicable for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made applicable to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being performed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors 16 or processing units, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any applicable media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination such that, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
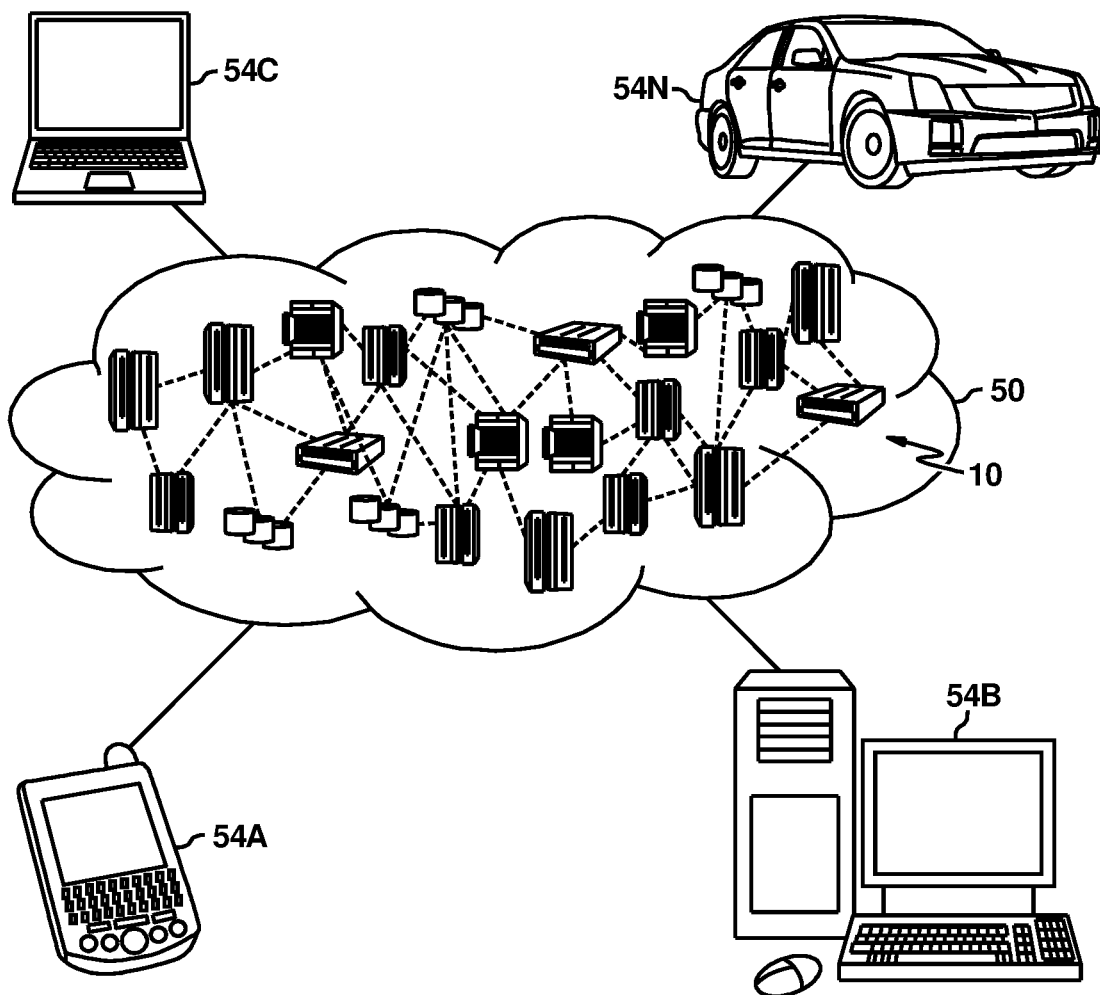
FIG. 2 depicts a cloud computing environment according to an embodiment.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination such that. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
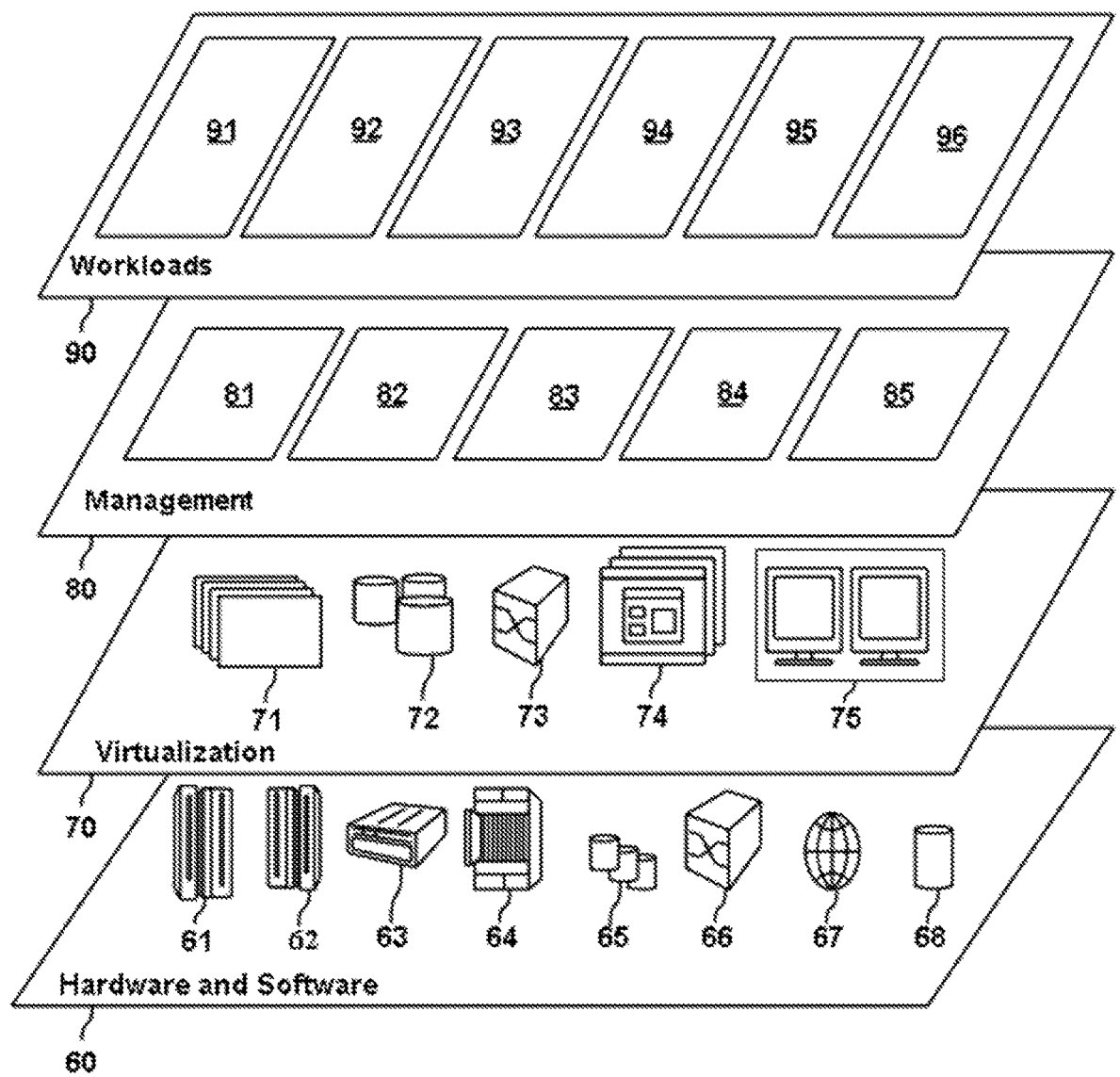
FIG. 3 depicts abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dual-active database management 96 will be described in the following embodiments of the present disclosure.

Dual-active database systems are a common solution for satisfying the business operations based on mission-critical systems. A typical dual-active database system provides the users two sets of data which are consistent with each other, for instance, a local database site and a remote database site which provide the same data service to users of credit cards, debit cards or other bank account operations. A database site comprises a plurality of disks or other appropriate data storage devices in which data is stored and managed for specific purposes or objectives. The database site further comprises one or more data management components which perform data management. The database site may further comprise other components which provide multiple functions and services to enhance the database site. As a result, the operations of the business are dependent upon the availability of data stored in databases systems (e.g., a dual-active database system). Due to the mission-critical nature of these database systems, the database systems need to be protected themselves against loss of the data due to software or hardware problems, disasters, or temporary unavailability of database systems resulting from performing system maintenance. On the other hand, efficiencies and qualities of data protection by means of existing data protection methods and approaches for database systems are not easy to be guaranteed in existing dual-active database system.

Figure 4:
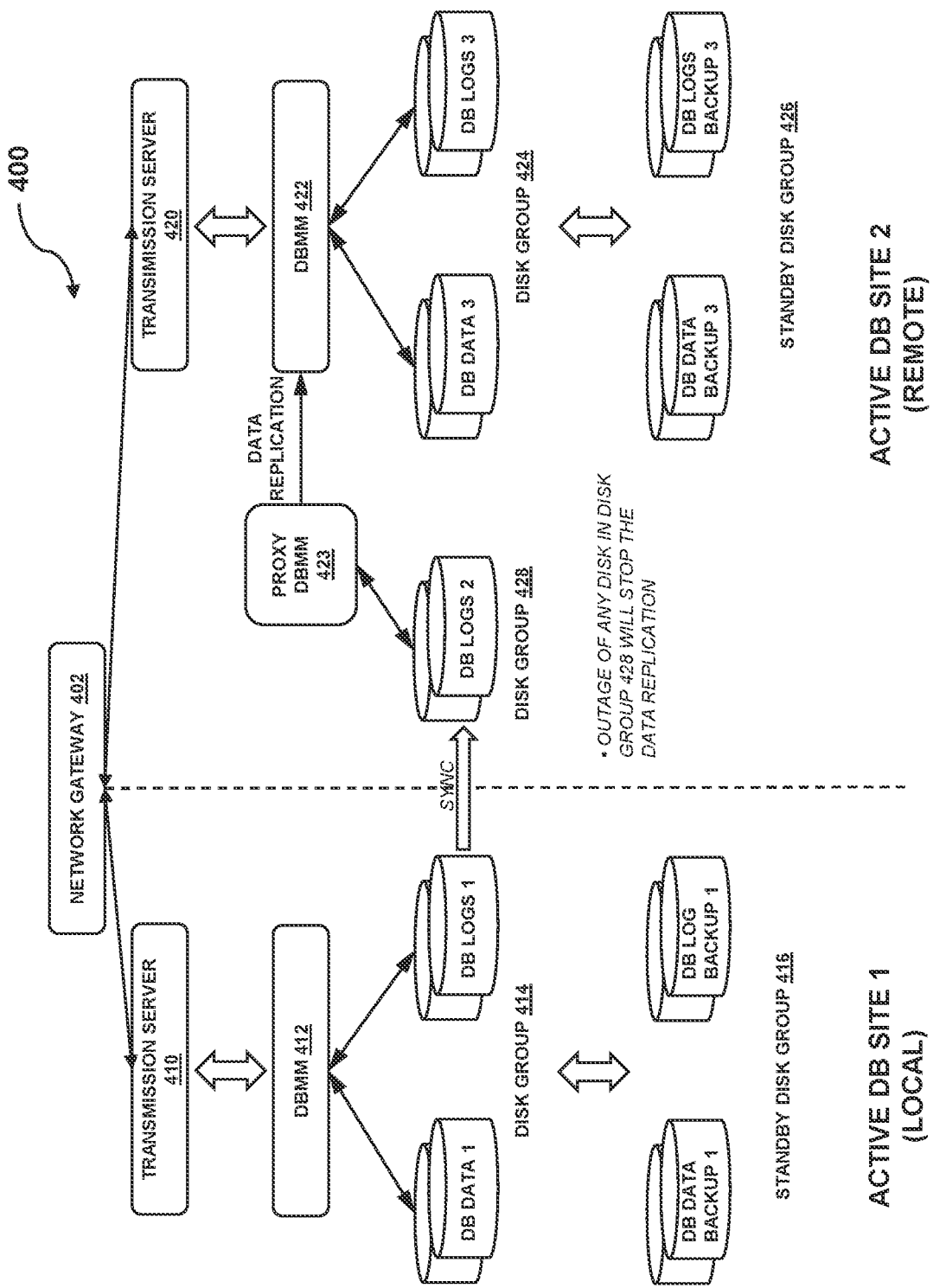
FIG. 4 depicts a block diagram illustrating an exemplary dual-active database system.

With reference now to FIG. 4, this figure depicts block diagrams illustrating an exemplary existing dual-active database system. It should be recognized that the arrangement of elements or modules in FIG. 4 and the number of elements or modules depicted therein are provided for the purpose of illustration only.

In some embodiments, as shown in FIG. 4, an example of adual-active database system 400 is provided to implement a computer-implemented method for database management for business operations based on mission-critical systems. The existing dual-active database system 400 comprises an active database site 1 and an active database site 2 which store respectively a set of data. The dual-active database system 400 provides two sets of data to users simultaneously, and contents of the two sets of data are consistent with each other. In some embodiments, the active database site 1 may be a local database site which provides local data service to users who access data from local clients or devices, for instance, Automated Teller Machines, supermarket cashiers or mobile phones. Accordingly, the active database site 2 may be a remote database site which provides remote data services to users who access data from remote clients/devices or provides local data services to users who access data from the location near the active database site 2. The active database site 2 may also perform data backup service to the active database site 1 for providing a higher data safety redundancy and system robustness. The dual-active database system 400 further comprises a network gateway 402 which provides a network connection between the active database site 1 and the active database site 2. As a result, the active database site 1 and the active database site 2 can transfer data or information to each other through networks. The active database site 1 comprises a transmission server 410, a database management module (DBMM) 412, a disk group 414 and a standby disk group 416. Accordingly, the active database site 2 comprises a transmission server 420, a database management module (DBMM) 422, a disk group 424 and a standby disk group 426. The transmission server 410 or 420 may send or receive data through the network connection. The transmission server 410 or 420 may provide the data received through the network connection to the DBMM 412 or 422 respectively or receive the data provided by DBMM 412 or 422 respectively. The DBMM 412 or 422 may perform various typical database management operations inside itself, for instance, reading, writing, copying, moving, ordering, creating, deleting, merging, indexing, finding, positioning, linking etc. The DBMM 412 or 422 may perform data management operations in a de-centralized or distributed environment, for instance, cloud data management or blockchain data management. The DBMM 412 or 422 may respectively manage the corresponding disk group 414 or 424. The disk group 414 or 424 may store data and/or database logs which may be related to the business operations based on mission-critical systems. The database logs may comprise archived or non-archived data and/or data-related information which records and/or present various features about data operations. Data actually stored on one data storage device can be replicated on another data storage device by database management systems, for instance, the DBMM 412 or 424. The DBMM 412 manages database data 1 and database logs 1 stored on the disk group 414 in which the database logs 1 are synchronously provided to the active database site 2 for data replication through the network connection. The DBMM 412 or 422 may also respectively manage the corresponding standby disk group 416 or 426. The data 1 and/or the database logs 1 stored on the disk group 414 are synchronously or asynchronously mirrored or duplicated on the standby disk group 416. The DBMM 412 may check hardware or software failures in the disk group 414 and relief the hardware or software failures of the disk group 414 by using the standby disk group 416, for instance, restoring data errors by replicating correct data from the standby disk group 416 to the disk group 414 or replacing faulty disks of the disk group 414 by normal disks of the disk group 414 within data mirrors or duplications. In the same manner, the DBMM 422 may relief hardware or software failures of the disk group 424 by using the standby disk group 426.

Furthermore, the active database site 2 comprises a proxy database management module (proxy DBMM) 423 and a disk group 428. The proxy DBMM 423 may synchronously receive database logs from the active database site 1 through the network connection and store the received database logs on the disk group 428 as referred to database logs 2. The proxy DBMM 423 further loads the database logs 2 from the disk group 428 and replicates data based on the database logs 2, then the replicated data and the database logs 2 are provided to the DBMM 422 which may use the replicated data and the database log 2 to update data and database logs stored on the disk group 424 as referred to database data 3 and database logs 3. As a result, data and database logs stored in the active database site 1 and 2 are consistent with each other. Moreover, the database logs 2 stored on the disk group 428 of the active database site 2 may be synchronized with database logs 1 stored in the disk group 414 of the active database site 1 in which a consistency pair including the disk group 414 and 428 is formed.

With reference to FIG. 4, it may be recognized that disks of the disk group 428 have no backup disks or data copy which can relief hardware or software failures of the disk group 428 when any disk or data of the disk group 428 occurs faults. It means that outage of any disk in the disk group 428 will cause that the data replication from the active database site 1 to the active database site 2 has to stop. This potential system safety risk, which is called as a Single Point of Failures (SPOF), will impact data consistence between the active database site 1 and the active database site 2. Therefore, there is a need to solve the aforementioned problems on existing dual-active database systems and provide an efficient data protection solution to the dual-active database systems.

Figure 5:
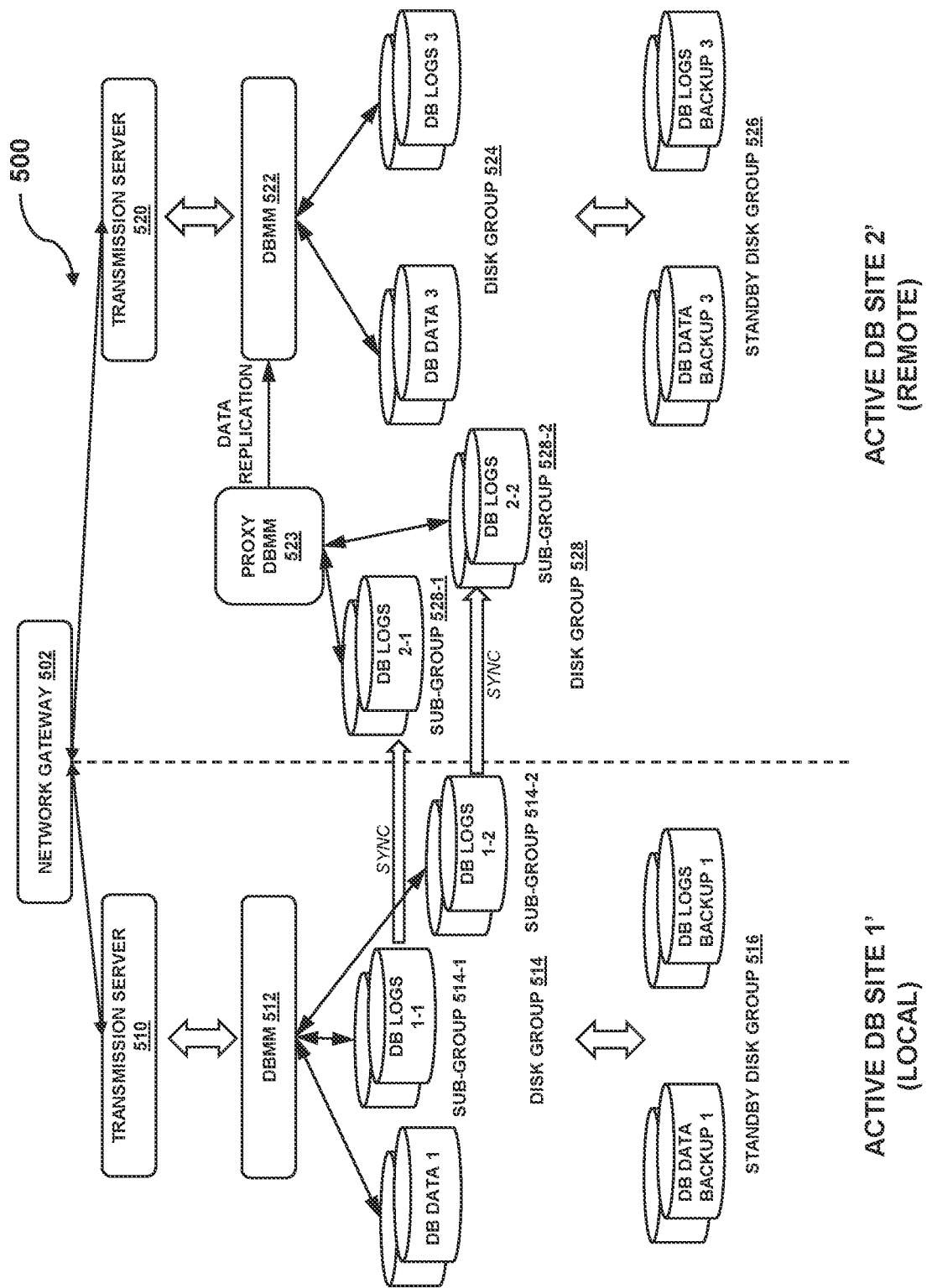
FIG. 5 depicts a block diagram illustrating an exemplary dual-active database system according to some embodiments of the present disclosure.

As mentioned in the above, a method, system and computer program product for dual-active database improved for data protection can be employed in data management for business operations based on mission-critical systems, for instance, bank account data management, internet trades data management or enterprise internal data management. With reference now to FIG. 5, it depicts block diagrams illustrating an exemplary dual-active database system according to some embodiments of the present disclosure. It should be recognized that the arrangement of elements or modules in FIG. 5 and the number of elements or modules depicted therein are provided for the purpose of illustration only. In other embodiments, a dual-active database system 500 may include more, less and/or different elements or modules and be with different arrangements.

In some embodiments of the present disclosure, the dual-active database system 500 is provided to implement a computer-implemented method for dual-active database improved for data protection. The dual-active database system 500 comprises an active database site 1' and an active database site 2' which store respectively a set of data. The dual-active database system 500 may provide two sets of data to users simultaneously, and contents of the two sets of data are consistent with each other. In some embodiments of the present disclosure, the active database site 1' may be a local database site which provides local data service to users who access data from local clients or devices, for instance, ATM, supermarket cashiers or mobile phones etc. Accordingly, the active database site 2' may be a remote database site which provides remote data service to users who access data from remote clients/devices or provide local data service to users who access data from locations near the active database site 2. The active database site 2' may also perform data backup service to the active database site 1' for providing a higher data safety redundancy and system robustness.

As shown in FIG. 5, the dual-active database system 500 further comprises a network gateway 502 which provides a network connection between the active database site 1' and the active database site 2'. The active database site 1' and the active database site 2' can transfer data or information each other through networks, for instance, the network connection provided through the network gateway 502. The active database site 1' comprises a transmission server 510, a database management module (DBMM) 512, a disk group 514 comprising a sub-group 514-1 and a sub-group 514-2, and a standby disk group 516. Accordingly, the active database site 2' comprises a transmission server 520, a database management module (DBMM) 522, a disk group 524 and a standby disk group 526. The transmission server 510 and 520 may send or receive data through the network connection. The transmission server 510 or 520 may provide the data, which is received through the network connection, to the DBMM 512 or 522 respectively or receive the data which is provided by DBMM 512 or 522 respectively. The DBMM 512 or 522 may perform various database management operations inside itself, for instance, reading, writing, copying, moving, ordering, creating, deleting, merging, indexing, finding, positioning, and linking etc. Furthermore, the DBMM 512 or 522 may perform data management operations in a de-centralized or distributed environment, for instance, cloud data management or blockchain data management. The DBMM 512 or 522 may respectively manage the corresponding disk group 514 or 524. The disk group 514 or 524 may store data and/or database logs which are related to the business operations based on mission-critical systems. The database logs may be archived or not archived data itself and/or data-related information which record and/or present various features about data operations. Data actually stored on one data storage device can be replicated on another data storage device by database management systems, for instance, the DBMM 512 or 524.

In some embodiments of the present disclosure, the DBMM 512 manages database data 1, database logs 1-1 and database logs 1-2 stored on the disk group 514 in which the database logs 1-1 and 1-2 are synchronously provided to the active database site 2' for data replication through the network connection. The database logs 1-1 may be stored on the sub-group 514-1 and the database logs 1-2 may be stored on the sub-group 514-2. When it is writing the database logs 1-2 on sub-group 514-2, the DBMM 512 may also store the database logs 1-1 on the sub-group 514-1 simultaneously in which contents of the database logs 1-2 are consistent with contents of the database logs 1-2 so that the database logs 1-2 may function as a duplication of the database logs 1-1. Correspondingly, the logs 1-1 may function as the duplication of the database logs 1-2. As a result, the DBMM 512 may check hardware or software failures in the sub-group 514-1 and 514-2, and relief the hardware or software failures occurred in one of the sub-group 514-1 and 514-2 by using another of the sub-group 514-1 and 514-2, for instance, restoring data errors by copying correct data duplications from the another of the sub-group 514-1 and 514-2 or replacing faulty disks of the one of the sub-group 514-1 and 514-2 with corresponding normal disks of the another of the sub-group 514-1 and 514-2.

In some embodiments of the present disclosure, the DBMM 512 or 522 also respectively manage the corresponding standby disk group 516 or 526. The database data 1 and the database logs 1-1 (or the database logs 1-2) which are stored on the disk group 514 are synchronously or asynchronously mirrored or duplicated on the standby disk group 516. The DBMM 512 may check hardware or software failures in the disk group 514 and relief the hardware or software failures of the disk group 514 by using the standby disk group 516, for instance, restoring data errors by replicating correct data from the standby disk group 516 to the disk group 514 or replacing faulty disks of the disk group 514 by using normal disks of the disk group 414 within data mirrors or duplications. Considering disk performance and system performing efficiency, it should be recognized that the DBMM 512 will use one of the sub-group 514-1 and 514-2 to relief the hardware or software failures occurred in another of the sub-group 514-1 and 514-2 prior to using the standby disk group 516 unless both of the sub-group 514-1 and 514-2 had occurred the same hardware or software failures. The DBMM 522 may also relief hardware or software failures of the disk group 524 by using the standby disk group 426 in a same manner.

In some embodiments, the database date 1, the database logs 1-1 and 1-2 are read by the DBMM 512 from the disk group 514, then are sent to the network gateway 502 by the transmission server 510 in the active database site 1. The transmission server 520 in the active database site 2' receives the database date1, the database logs 1-1 and 1-2 from the network gateway 502 and transfers the database data 1, database logs 1-1 and 1-2 to the DBMM 522 and a proxy database management module 523.

In some embodiments of the present disclosure, the active database site 2' further comprises the proxy database management module (proxy DBMM) 523 and a disk group 528 including a sub-group 528-1 and a sub-group 528-2. The proxy DBMM 523 may receive separately the database logs 1-1 and 1-2 from the active database site 1' through the network connection. The proxy DBMM 523 may store correspondingly the received database logs 1-1 on the sub-group 528-1 as referred to a database logs 2-1. The proxy DBMM 523 may store correspondingly the received database logs 1-2 on the sub-group 528-2 as referred to a database logs 2-2. The proxy DBMM 523 may synchronize separately the database logs 2-1 with the database logs 1-1 and the database logs 2-2 with the database logs 1-2. In some embodiments of the present disclosure, the proxy DBMM 523 may perform synchronizing automatedly and periodically. In some other embodiments of the present disclosure, the proxy DBMM 523 may be triggered real-timely to perform synchronizing while the DBMM 523 received system announcements that the database logs 1-1 and/or 1-2 are changed from the active database site 1', for instance, the DBMM 512 in the active database site 1' detected content changes of database logs 1-1 and/or 1-2 and generated a corresponding system announcement to notice the active database site 1'. Moreover, the synchronizing process between the database logs 1-1 and the database logs 2-1 is individually performed by the DBMM 523 and separated from the synchronizing process between the database logs 2-1 and the database logs 2-2. It means the two synchronizing processes don't impact or disturb each other even if one of the two synchronizing processes is interrupted due to software or hardware problems, disasters, or temporary unavailability of database systems resulting from performing system maintenance. The proxy DBMM 523 further may load the database logs 2-1 and/or 2-2 from the sub-group 528-1 and/or 528-2 and replicate data based on the database logs 2-1 and/or 2-2, then these replicated data and the database logs 2-1 and/or 2-2 are provided to the DBMM 522 which may use these replicated data and the database log 2-1 and/or 2-2 to update data and database logs stored on the disk group 524 as referred to database data 3 and database logs 3 shown in FIG. 5. As a result, data and database logs stored in the active database site 1' and 2' are consistent with each other. Here, the database logs 2-1 stored on the sub-group 528-1 of the active database site 2' are synchronized with the database logs 1-1 stored in the sub-group 514-1 of the active database site 1' in which a first consistency pair including the sub-group 514-1 and the sub-group 528-1 is formed. Correspondingly, the database logs 2-2 stored on the sub-group 528-2 of the active database site 2' are synchronized with the database logs 1-2 stored in the sub-group 514-2 of the active database site 1' in which a second consistency pair including the sub-group 514-2 and the sub-group 528-2 is formed. As the mentioned in the above, stored contents (e.g., database logs) of two sub-groups in a consistency pair will be synchronized to maintain consistency with each other. Furthermore, the stored contents of two sub-groups in a consistency pair will be real-time synchronized to maintain consistency with each other within an applicable threshold latency time, for instance, 0.001 second or a lower threshold latency time. The two consistency pairs don't impact or disturb each other even if one of the two consistency pairs maintains to work while another consistency pair stops work due to software or hardware problems, disasters, or temporary unavailability of database systems resulting from performing system maintenance.

In some embodiments of the present disclosure, the proxy DBMM 523 detects respective working statuses of the first consistency pair and the second consistency pair. Furthermore, the proxy DBMM 523 may mark an abnormal status tag on one of the two consistency pairs while the proxy DBMM 523 detects that one of the two consistency pairs stops work. For example, the proxy DBMM 523 detects that the second consistency pair stops work due to performing system maintenance such as replacing some long-term used disks in the sub-group 528-2 with new disks, then proxy DBMM 523 may mark an abnormal status tag of stopping or suspending on the second consistency pair. The proxy DBMM 523 further loads the database logs 2-1 stored on the sub-group 528-1 or the database logs 2-2 stored on the sub-group 528-2. The proxy DBMM 523 further replicates data based at least in part on the loaded database logs from the sub-group 528-1 or the sub-group 528-2.

In some embodiments of the present disclosure, the proxy DBMM 523 may pre-load a part of contents of the database logs 2-1 and the database logs 2-2, then analyze the part of contents of the database logs 2-1 and the database logs 2-2 to check content errors or the abnormal status tag for ensuring to load correct content of database logs for data replication. The active database site 2' may use various existing applicable database error analysis methods which are omitted to be descripted herein for the sake of simplicity. Furthermore, the proxy DBMM 523 may switch reading routine to one of the sub-group 528-1 and the sub-group 528-2 in response to recognizing out the content errors or the abnormal status tag in the part of contents of the database logs stored on another of the sub-group 528-1 and the sub-group 528-2. For instance, the proxy DBMM 523 switches reading routine to the sub-group 528-1 in response to recognizing out the content errors or the abnormal status tag in the part of contents of the database logs stored on the sub-group 528-2. Conversely, the proxy DBMM 523 switches reading routine to the sub-group 528-2 in response to recognizing out the content errors or the abnormal status tag in the part of contents of the database logs stored on the sub-group 528-1. The proxy DBMM 523 further load the database logs, for instance, a part of the database logs or the whole database logs, stored on the one of the sub-group 528-1 and the sub-group 528-2 based on the switching for data replication. In some embodiments of the present disclosure, the dual-active database system 500 does not recognize out any content errors or the abnormal status tag in the part of contents of the database logs. The proxy DBMM 523 may switch reading routine to one of the sub-group 528-1 and the sub-group 528-2 in response to not recognizing out the content errors or the abnormal status tag in which the one of the sub-group 528-1 and the sub-group 528-2 has the earliest log sequence number. For determining the earliest log sequence number, the proxy DBMM 523 may compare the largest log sequence number respectively comprising in the database logs 2-1 or the database logs 2-2 based on creation time of the largest log sequence number. The proxy DBMM 523 further load the database logs, for instance, a part of the database logs or the whole database logs, stored on the one of the sub-group 528-1 and the sub-group 528-2 based on the switching in response to not recognizing out the content errors or the abnormal status tag for data replication.

Notwithstanding, the dual-active database system 500 depicted in FIG. 5 comprises the aforementioned modules, but there is no limitation provided to modules or elements comprised in the dual-active database system 500. The dual-active database system 500 may comprise other modules or elements for implementing more functionalities and objectives in accordance with various user's requirements and experiences.

In some embodiments of the present disclosure, the dual-active database system 500 is implemented in a distributed computing environment, for instance, a cluster computing environment, a grid computing environment, a server/client network computing environment or a cloud computing environment, etc. A distributed computing environment can implement the dual-active database system 500 by components of the distributed computing environment comprising hardware, software or their combinations. According to performance and capability based on a distributed computing environment, the dual-active database system 500 can perform the computer-implemented method for feature-based intent item recommendation which will be described in the present disclosure.

In some embodiments of the present disclosure, the dual-active database system 500 may be deployed on remote computing platforms, for example, a cloud computing platform and/or a cloud storage service system which can provide remote computing resource to implement at least part of functionalities of the dual-active database system 500 and provide respective computing resources, information resource or supporting services, for instance, massive remote storage space for intent item datasets. In these embodiments, the remote computing platforms would be resilient and adapted to computing performance, storage capacity, response speed, display effect and the like in accordance with user requirements.

In some embodiments of the present disclosure, components of the dual-active database system 500 are in communication with each other by means of electronic or wireless connections, for instance, cables, buses, local area network (LAN), general wide area network (WAN), public network (e.g., the Internet), Wi-Fi network, Bluetooth connection or a combination of them, etc.

It would be noted that the dual-active database system 500 could be implemented by computer system/server 12 as shown in FIG. 1 and distributed cloud computing environment 50 as shown in FIGS. 2 and 3, for instance, a plurality of cloud computing nodes 10 perform the process management in distributed cloud computing environment 50 which further comprise respective cloud components implementing functions such as the standby disk group 516 and 526. Here, the dual-active database system 500 is exemplarily and abstractly illustrated by a block diagram which does not explicitly exhaust or precisely limit entirety or components of the dual-active database system 500 as shown in FIG. 5. Furthermore, it would be recognized that number and arrangement of elements or modules (the number of elements or modules and the arrangement thereof) in FIG. 5 are provided for the purpose of illustration only. An element or module can also be merged with other elements or modules to construct a new element or module which can implement all functions of the merged elements or modules or be split into two or more independent elements or modules which respectively implement a part of functions of the element or module.

With reference now to FIG. 5, a process flow chart 600 of a method for dual-active database improved for data protection is depicted according to embodiments of the present disclosure. The process flow chart 600 is a corresponding method implemented by the dual-active database system 500 described herein by means of one or more processors in a cloud computing system as shown in FIGS. 1, 2 and 3.

At operation 602, the dual-active database system 500 may deploy a dual-active database on a first active database site (e.g., the active database site 1') and a second active database site (e.g., the active database site 2'). The first active database site comprises a first group of disks (e.g., the disk group 514) which includes a first sub-group of disks (e.g., the sub-group 514-1) and a second sub-group of disks (e.g., the sub-group 514-2) respectively corresponding to a third sub-group of disks (e.g., the sub-group 528-1) and a fourth sub-group of disks (e.g., the sub-group 528-2) included in a second group of disks (e.g., the disk group 528) which is comprised in the second active database site. The dual-active database system 500 may provide two sets of data to users simultaneously, and contents of the two sets of data are consistent with each other. In some embodiments of the present disclosure, a first active database site may be a local database site which provides local data services to users who access data from local clients or devices, for instance, ATM, supermarket cashiers or mobile phones etc. Accordingly, the second active database site may be a remote database site which provides remote data services to users who access data from remote clients/devices or provide local data service to users who access data from locations near the second active database site. The second active database site may also perform data backup services to the first active database site for providing a higher data safety redundancy and system robustness. The disks may include various types of applicable storage devices which can store data and perform various data operations such as reading, writing, moving or copying etc.

At operation 604, the dual-active database system 500 may store a first set of database logs (e.g., the database logs 1-1) on the first sub-group of disks while a second set of database logs (e.g., the database logs 1-2) is being written on the second sub-group of disks. Contents of the second set of database logs are consistent with contents of the first set of database logs and function as a duplication of the first set of database logs. The dual-active database system 500 can implement the content consistency between the first set of database logs and the second set of database logs by applicable hardware/software methods, for instance, hardware/software Redundant Arrays of Independent Disks (RAID).

At operation 606, the dual-active database system 500 may synchronize separately a third set of database logs (e.g., the database logs 2-1) on the third sub-group of disks with the first set of database logs on the first sub-group of disks and a fourth set of database logs (e.g., the database logs 2-2) on the fourth sub-group of disks with the second set of database logs on the second sub-group of disks. The first sub-group of disks and the third sub-group of disks form a first consistency pair, for instance, the first consistency pair which includes the sub-group 514-1 and the sub-group 528-1 shown in FIG. 5, and the second sub-group of disks and the fourth sub-group of disks form a second consistency pair, for instance, the second consistency pair which includes the sub-group 514-2 and the sub-group 528-2 shown in FIG. 5. Whole contents stored respectively on two sub-group of disks which is comprised in one of the two consistency pairs, for instance, the first consistency pair which includes the sub-group 514-1 and the sub-group 528-1 shown in FIG. 5, are real-time synchronized to keep consistency within an applicable threshold latency time. The two consistency pairs don't impact or disturb each other even if one of the two consistency pairs maintains to work while another consistency pair stops work due to software or hardware problems, disasters, or temporary unavailability of database systems resulting from performing system maintenance.

Figure 6:
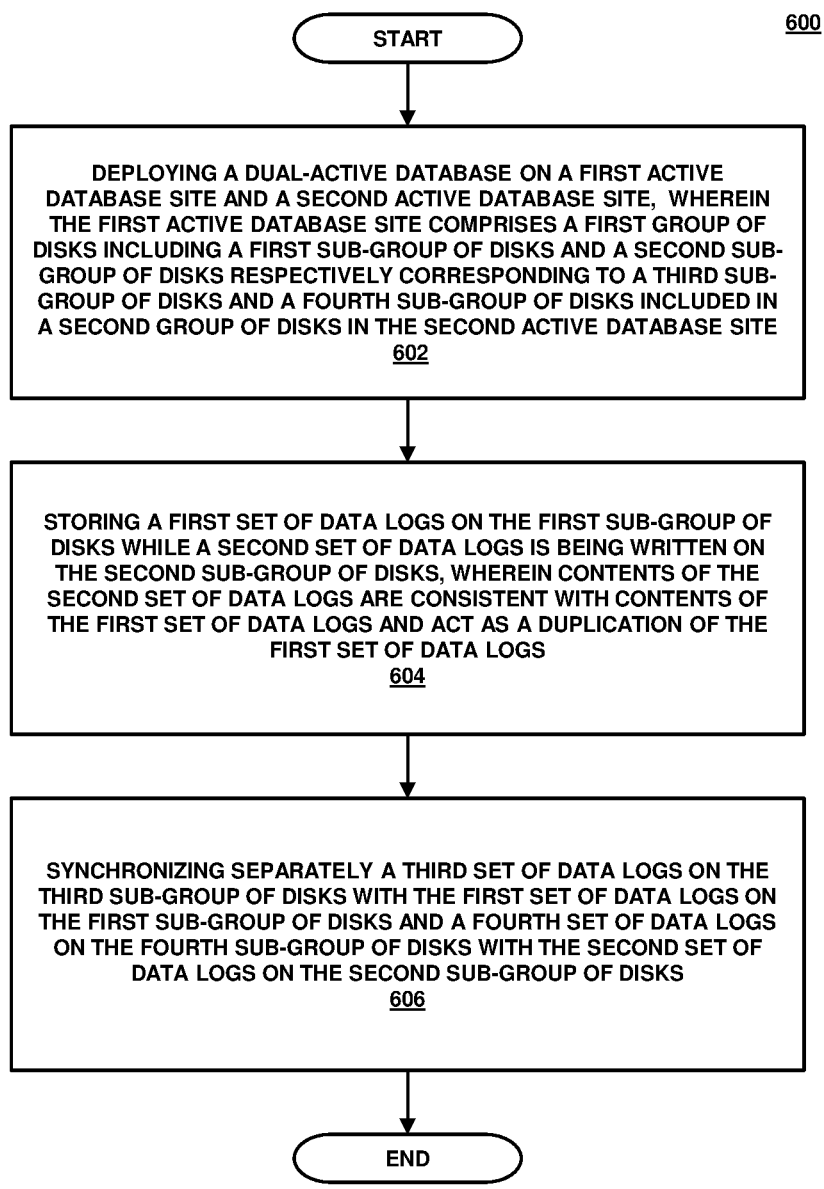
FIG. 6 depicts a flow chart illustrating an exemplary dual-active database management method according to some embodiments of the present disclosure.

It should be noted that the processing of process management is exemplarily and abstractly illustrated by the process flow chart 600 which does not limit the method of process management as shown in FIG. 6.

Figure 7:
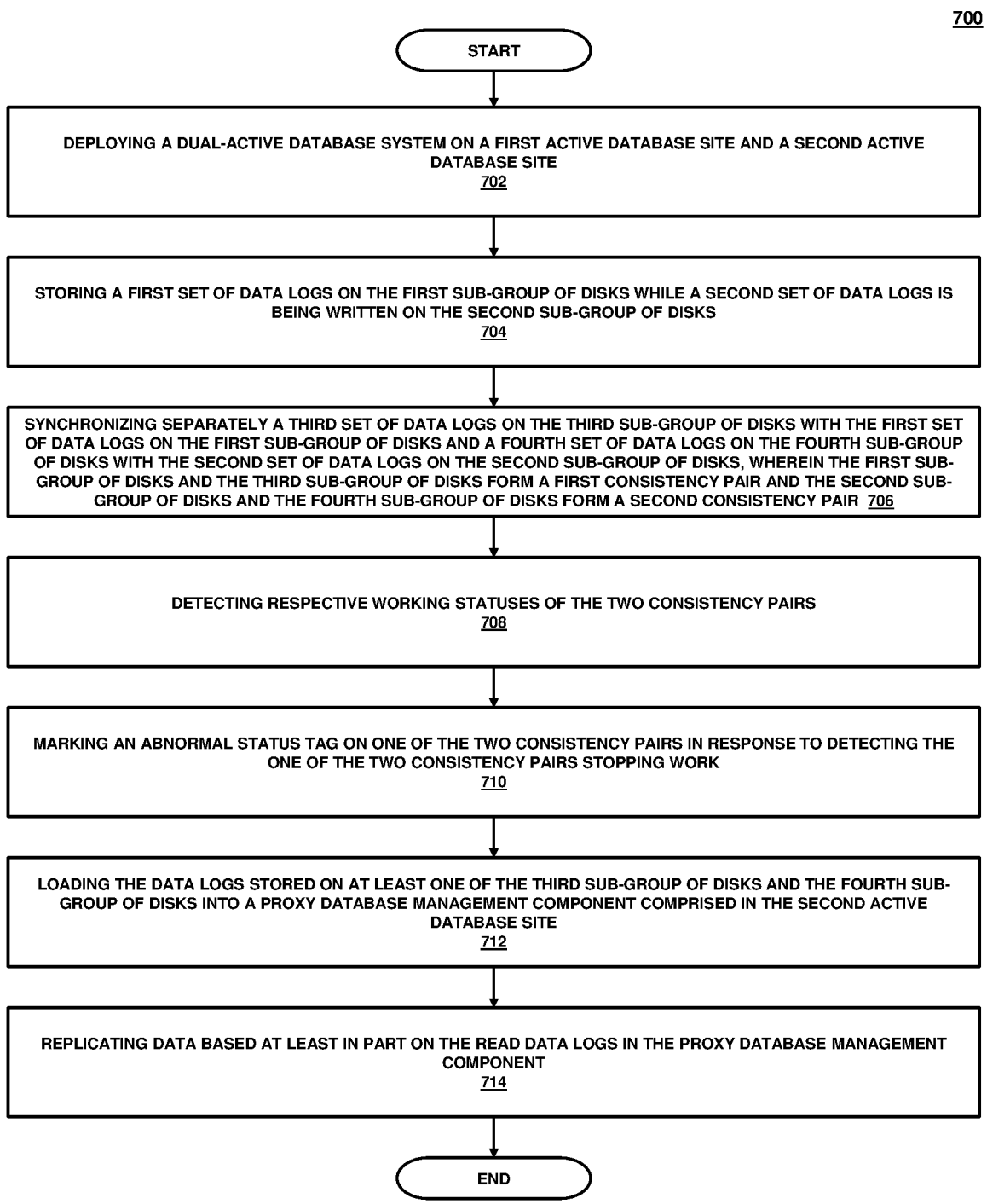
FIG. 7 depicts a flow chart illustrating another exemplary dual-active database management method according to some embodiments of the present disclosure.

With reference now to FIG. 7, a process flow chart 700 of an exemplary method for dual-active database improved for data protection is depicted according to embodiments of the present disclosure. The exemplary method depicted by the process flow chart 700 can be implemented by a computing system as a dual-active database system 500 shown in FIG. 5, and comprises the method for dual-active database improved for data protection as shown in FIG. 6.

At operation 702, the dual-active database system 500 may deploy a dual-active database on a first active database site (e.g., the active database site 1') and a second active database site (e.g., the active database site 2'). The first active database site comprises a first group of disks (e.g., the disk group 514) which includes a first sub-group of disks (e.g., the sub-group 514-1) and a second sub-group of disks (e.g., the sub-group 514-2) respectively corresponding to a third sub-group of disks (e.g., the sub-group 528-1) and a fourth sub-group of disks (e.g., the sub-group 528-2) included in a second group of disks (e.g., the disk group 528) which is comprised in the second active database site.

At operation 704, the dual-active database system 500 may store a first set of database logs (e.g., the database logs 1-1) on the first sub-group of disks while a second set of database logs (e.g., the database logs 1-2) is being written on the second sub-group of disks. Contents of the second set of database logs are consistent with contents of the first set of database logs and function as a duplication of the first set of database logs.

At operation 706, the dual-active database system 500 may synchronize separately a third set of database logs (e.g., the database logs 2-1) on the third sub-group of disks with the first set of database logs on the first sub-group of disks and a fourth set of database logs (e.g., the database logs 2-2) on the fourth sub-group of disks with the second set of database logs on the second sub-group of disks.

At operation 708, the dual-active database system 500 may detect respective working statuses of the two consistency pairs. The dual-active database system 500 may detect the working status of a consistency pairs by means of existing hardware status monitors or system/disk status monitoring software which are omitted herein for sake of simplicity.

At operation 710, the dual-active database system 500 may mark an abnormal status tag on one of the two consistency pairs in response to detecting the one of the two consistency pairs stopping work. For example, the dual-active database system 500 detects that the second consistency pair stops work due to performing system maintenance such as replacing some long-term used disks in the sub-group 528-2 with new disks, then the dual-active database system 500 may mark an abnormal status tag of stopping/suspending on the second consistency pair. The dual-active database system 500 may mark an abnormal status tag on one of the two consistency pairs by means of various existing software or hardware methods, for instance, writing a specific value according to the stopping/suspending status of the consistency pair into an entry of a system registry corresponding to the consistency pair.

At operation 712, the dual-active database system 500 may load the database logs stored on at least one of the third sub-group of disks and the fourth sub-group of disks into a proxy database management component (e.g., the proxy DBMM 523) comprised in the second active database site.

At operation 712, the dual-active database system 500 may replicate data based at least in part on the loaded database logs in the proxy database management component. In some embodiments of the present disclosure, the dual-active database system 500 may replicate data based on the loaded database logs themselves. In some embodiments of the present disclosure, the dual-active database system may replicate data based on the loaded database logs and previous data stored in the dual-active database system 500.

It should be noted that the processing of process management is exemplarily and abstractly illustrated by the process flow chart 700 which does not limit the method of process management as shown in FIG. 7.

Figure 8:
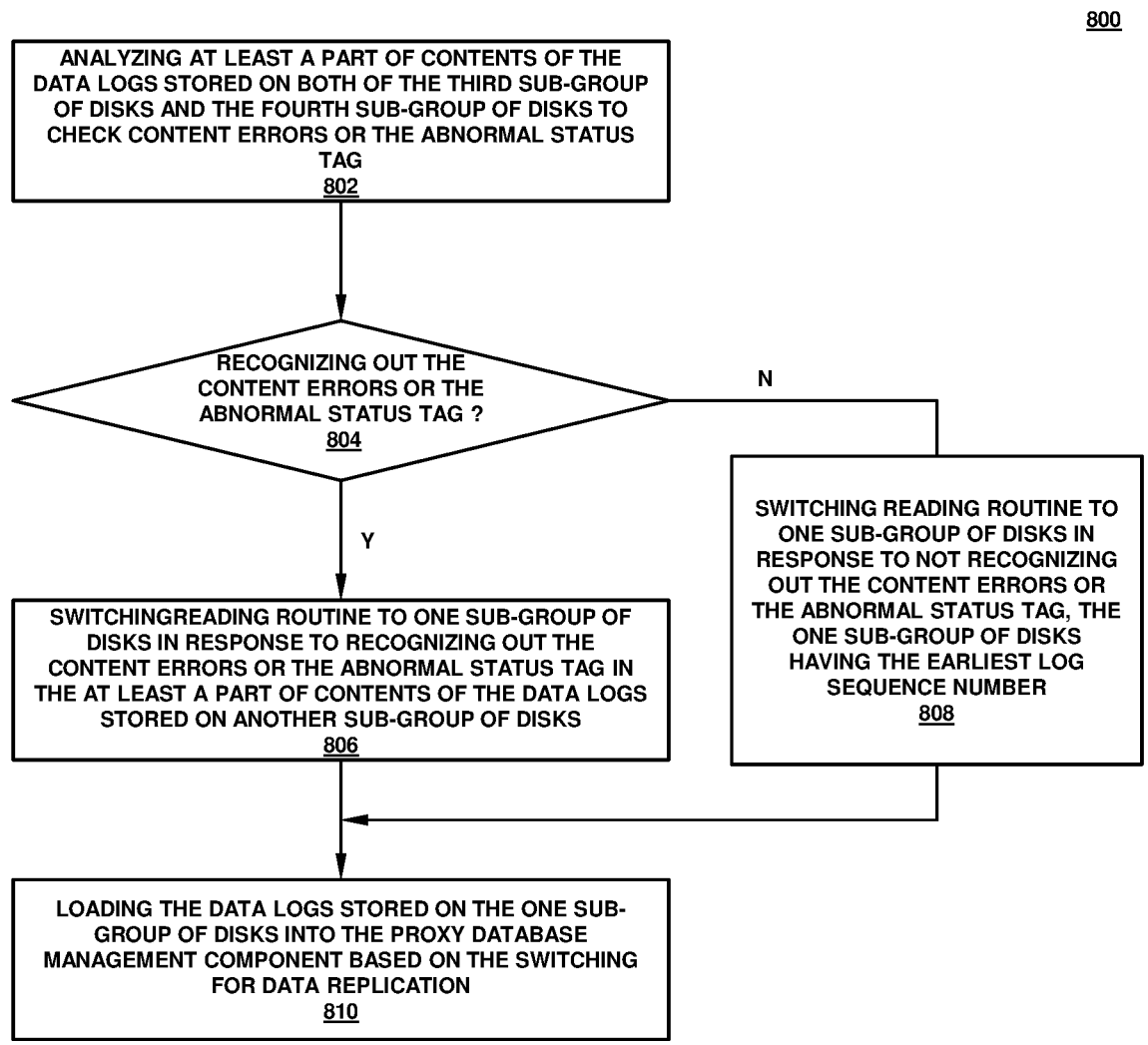
FIG. 8 depicts a flow chart illustrating another exemplary loading data method in a dual-active database system according to some embodiments of the present disclosure.

With reference now to FIG. 8, in which a process flow chart 800 of an exemplary method of loading database logs for dual-active database improved for data protection is depicted according to some embodiments of the present disclosure. The exemplary method depicted by the process flow chart 800 can be implemented by a computing system as the dual-active database system 500 shown in FIG. 5, and can be comprised in the method for dual-active database improved for data protection as shown in FIG. 7.

As mentioned in the process flow chart 700 of the exemplary method for dual-active database improved for data protection shown in FIG. 7, the dual-active database system 500 may load the database logs stored on at least one of the third sub-group of disks and the fourth sub-group of disks into a proxy database management component (e.g., the proxy DBMM 523) comprised in the second active database site. For ensuring to load correct content of correct database logs for data replication, the dual-active database system 500 further performs steps of the exemplary method of loading database logs comprised in a process flow chart 800 shown in FIG. 8.

At operation 802, the dual-active database system 500 may analyze at least a part of contents of the database logs stored on both of the third sub-group of disks and the fourth sub-group of disks to check content errors or the abnormal status tag.

The dual-active database system 500 may pre-load a part of contents of the database logs stored on both of the third sub-group of disks and the fourth sub-group of disks for analyzing the part of contents of the database logs. The dual-active database system 500 may use various existing applicable database error analysis methods which are omitted herein for the sake of simplicity.

At operation 804, the dual-active database system 500 may recognize the content errors or the abnormal status tag based on the analyzing.

At operation 806, the dual-active database system 500 may switch reading routine to one of the third sub-group of disks and the fourth sub-group of disks in response to recognizing out the content errors or the abnormal status tag in the at least the part of contents of the database logs stored on another of the third sub-group of disks and the fourth sub-group of disks. For instance, the dual-active database system 500 switches reading routine to the third sub-group of disks in response to recognizing out the content errors or the abnormal status tag in a part of contents of the database logs stored on the fourth sub-group of disks. Conversely, the dual-active database system 500 switches reading routine to the fourth sub-group of disks in response to recognizing out the content errors or the abnormal status tag in a part of contents of the database logs stored on the third sub-group of disks.

At operation 808, the dual-active database system 500 may switch reading routine to one of the third sub-group of disks and the fourth sub-group of disks in response to not recognizing out the content errors or the abnormal status tag. The one of the third sub-group of disks and the fourth sub-group of disks has the earliest log sequence number. For determining the earliest log sequence number, the dual-active database system 500 may compare the largest log sequence number respectively comprising in the third sub-group of disks or the fourth sub-group of disks based on the creation time of the largest log sequence number.

At operation 810, the dual-active database system 500 may load the database logs stored on the one of the third sub-group of disks and the fourth sub-group of disks into the proxy database management component based on the switching for data replication.

As mentioned in the above, it is recognized that disks of the disk group 528 comprising two consistency pairs have backup disks (e.g., the sub-group 528-2) or a data duplication which can relief hardware or software failures of the disk group 528 when any disk or data of the disk group 528 (e.g., sub-group 528-1) occurs faults. As a result, outage of any disk in the disk group 528 will not arise that the data replication from the active database site 1' to the active database site 2' has to stop. The present disclosure may avoid potential system or data safety risks from SPOF and keep data consistence between the active database site 1' and the active database site 2'. Furthermore, the present disclosure may provide significant improvements on system stableness and maintainability, for instance, one of the consistency pairs in the present disclosure can stop/suspend to perform system maintenance during the database system still normally works. The system maintenance will not interrupt data service for satisfying business operations based on mission-critical systems.

It should be noted that the exemplary methods for process management according to embodiments of this disclosure could be implemented by computer system/server 12 of FIG. 1.

The present embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/actions specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiments. In particular, a feature (device-like or method-like) recited in a given embodiment, variant or shown in a drawing may be combined with or replace another feature in another embodiment, variant or drawing, without departing from the scope of the present disclosure. Various combinations of the features described in respect of any of the above embodiments or variants may accordingly be contemplated, that remain within the scope of the appended claims. In addition, many minor modifications may be made to adapt a particular situation or material to the teachings of the present disclosure without departing from its scope. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a database system comprising:
deploying, by one or more processors, a dual-active database on a first active database site and a second active database site, wherein the first active database site comprises a first group of disks including a first sub-group of disks and a second sub-group of disks respectively corresponding to a third sub-group of disks and a fourth sub-group of disks included in a second group of disks in the second active database site;

storing, by the one or more processors, a first set of database logs on the first sub-group of disks while a second set of database logs is being written on the second sub-group of disks, wherein contents of the second set of database logs are consistent with contents of a first set of database logs and function as a duplication of the first set of database logs; and synchronizing, by the one or more processors, separately a third set of database logs on the third sub-group of disks with the first set of database logs on the first sub-group of disks and a fourth set of database logs on the fourth sub-group of disks with the second set of database logs on the second sub-group of disks, wherein the first sub-group of disks and the third sub-group of disks form a first consistency pair and the second sub-group of disks and the fourth sub-group of disks form a second consistency pair in which whole contents respectively stored on two sub-group of disks comprised in one of the first consistency pair and second consistency pair are synchronized to keep consistency within an applicable threshold latency time.

2. The computer-implemented method of claim 1, wherein one of first consistency pair and second consistency pair maintains to work while the other consistency pair stops work.

3. The computer-implemented method of claim 1, further comprising:

detecting, by the one or more processors, respective working statuses of first consistency pair and second consistency pair; and marking, by the one or more processors, an abnormal status tag on one of the first consistency pair and second consistency pair in response to detecting the one of the first consistency pair and second consistency pair stopping work.

4. The computer-implemented method of claim 3, further comprising:

loading, by the one or more processors, the database logs stored on at least one of the third sub-group of disks and the fourth sub-group of disks into a proxy database management component comprised in the second active database site; and replicating, by the one or more processors, data based at least in part on loaded database logs in the proxy database management component.

5. The computer-implemented method of claim 4, wherein loading the database logs stored on the at least one of the third sub-group of disks and the fourth sub-group of disks into the proxy database management component comprised in the second active database site comprises:

analyzing, by the one or more processors, at least a part of contents of the database logs stored on both of the third sub-group of disks and the fourth sub-group of disks to check content errors or the abnormal status tag;

recognizing, by the one or more processors, the content errors or the abnormal status tag based on the analyzing;

switching, by the one or more processors, reading routine to one of the third sub-group of disks and the fourth sub-group of disks in response to recognizing out the content errors or the abnormal status tag in the at least a part of contents of the database logs stored on the other one of the third sub-group of disks and the fourth sub-group of disks; and loading, by the one or more processors, the database logs stored on the one of the third sub-group of disks and the fourth sub-group of disks into the proxy database management component based on the switching for data replication.

6. The computer-implemented method of claim 5, wherein loading the database logs stored on the at least one of the third sub-group of disks and the fourth sub-group of disks into the proxy database management component comprised in the second active database site further comprises:

switching, by the one or more processors, reading routine to one of the third sub-group of disks and the fourth sub-group of disks in response to not recognizing out the content errors or the abnormal status tag, the one of the third sub-group of disks and the fourth sub-group of disks having an earliest log sequence number.

7. The computer-implemented method of claim 2, wherein the other consistency pair stops work for one reason selected from the group consisting of system maintenance, hardware or software failures, and disasters.

8. A system comprising:

one or more computer readable storage media with program instructions collectively stored on the one or more computer readable storage media; and one or more processors configured to execute the program instructions to perform a method comprising:

deploying a dual-active database on a first active database site and a second active database site, wherein the first active database site comprises a first group of disks including a first sub-group of disks and a second sub-group of disks respectively corresponding to a third sub-group of disks and a fourth sub-group of disks included in a second group of disks in the second active database site;

storing a first set of database logs on the first sub-group of disks while a second set of database logs is being written on the second sub-group of disks, wherein contents of the second set of database logs are consistent with contents of a first set of database logs and function as a duplication of the first set of database logs; and synchronizing separately a third set of database logs on the third sub-group of disks with the first set of database logs on the first sub-group of disks and a fourth set of database logs on the fourth sub-group of disks with the second set of database logs on the second sub-group of disks, wherein the first sub-group of disks and the third sub-group of disks form a first consistency pair and the second sub-group of disks and the fourth sub-group of disks form a second consistency pair in which whole contents respectively stored on two sub-group of disks comprised in one of first consistency pair and second consistency pair are synchronized to keep consistency within an applicable threshold latency time.

9. The system of claim 8, the method further comprising:

detecting, by the one or more processors, respective working statuses of the first consistency pair and second consistency pair; and marking, by the one or more processors, an abnormal status tag on one of the first consistency pair and second consistency pair in response to detecting the one of the first consistency pair and second consistency pair stopping work.

10. The system of claim 9, the method further comprising:
loading, by the one or more processors, the database logs stored on at least one of the third sub-group of disks and the fourth sub-group of disks into a proxy database management component comprised in the second active database site; and
replicating, by the one or more processors, data based at least in part on loaded database logs in the proxy database management component.

11. The system of claim 10, wherein loading the database logs stored on the at least one of the third sub-group of disks and the fourth sub-group of disks into the proxy database management component comprised in the second active database site comprises:
analyzing, by the one or more processors, at least a part of contents of the database logs stored on both of the third sub-group of disks and the fourth sub-group of disks to check content errors or the abnormal status tag;
recognizing, by the one or more processors, the content errors or the abnormal status tag based on the analyzing;
switching, by the one or more processors, reading routine to one of the third sub-group of disks and the fourth sub-group of disks in response to recognizing out the content errors or the abnormal status tag in the at least a part of contents of the database logs stored on the other one of the third sub-group of disks and the fourth sub-group of disks; and
loading, by the one or more processors, the database logs stored on the one of the third sub-group of disks and the fourth sub-group of disks into the proxy database management component based on the switching for data replication.

12. The system of claim 11, wherein loading the database logs stored on the at least one of the third sub-group of disks and the fourth sub-group of disks into the proxy database management component comprised in the second active database site further comprises:
switching, by the one or more processors, reading routine to one of the third sub-group of disks and the fourth sub-group of disks in response to not recognizing out the content errors or the abnormal status tag, the one of the third sub-group of disks and the fourth sub-group of disks having an earliest log sequence number.

13. A computer program product comprising:
one or more computer readable storage media, and program instructions collectively stored on the one or more computer readable storage media, the program instructions executable by one or more processors to cause the one or more processors to perform actions comprising:
deploying a dual-active database on a first active database site and a second active database site, wherein the first active database site comprises a first group of disks including a first sub-group of disks and a second sub-group of disks respectively corresponding to a third sub-group of disks and a fourth sub-group of disks included in a second group of disks in the second active database site;
storing a first set of database logs on the first sub-group of disks while a second set of database logs is being written on the second sub-group of disks, wherein contents of the second set of database logs are consistent with contents of a first set of database logs and function as a duplication of the first set of database logs; and
synchronizing separately a third set of database logs on the third sub-group of disks with the first set of database logs on the first sub-group of disks and a fourth set of database logs on the fourth sub-group of disks with the second set of database logs on the second sub-group of disks,
wherein the first sub-group of disks and the third sub-group of disks form a first consistency pair and the second sub-group of disks and the fourth sub-group of disks form a second consistency pair in which whole contents respectively stored on two sub-group of disks comprised in one of first consistency pair and second consistency pair are synchronized to keep consistency within an applicable threshold latency time.

14. The computer program product of claim 13, the actions further comprising:
detecting, by the one or more processors, respective working statuses of the first consistency pair and second consistency pair; and
marking, by the one or more processors, an abnormal status tag on one of the first consistency pair and second consistency pair in response to detecting the one of the first consistency pair and second consistency pair stopping work.

15. The computer program product of claim 14, the actions further comprising:
loading, by the one or more processors, the database logs stored on at least one of the third sub-group of disks and the fourth sub-group of disks into a proxy database management component comprised in the second active database site; and
replicating, by the one or more processors, data based at least in part on loaded database logs in the proxy database management component.

16. The computer program product of claim 15, wherein loading the database logs stored on the at least one of the third sub-group of disks and the fourth sub-group of disks into the proxy database management component comprised in the second active database site comprises:
analyzing, by the one or more processors, at least a part of contents of the database logs stored on both of the third sub-group of disks and the fourth sub-group of disks to check content errors or the abnormal status tag;
recognizing, by the one or more processors, the content errors or the abnormal status tag based on the analyzing;
switching, by the one or more processors, reading routine to one of the third sub-group of disks and the fourth sub-group of disks in response to recognizing out the content errors or the abnormal status tag in the at least a part of contents of the database logs stored on the other one of the third sub-group of disks and the fourth sub-group of disks; and
loading, by the one or more processors, the database logs stored on the one of the third sub-group of disks and the fourth sub-group of disks into the proxy database management component based on the switching for data replication.

17. The computer program product of claim 16, wherein loading the database logs stored on the at least one of the third sub-group of disks and the fourth sub-group of disks into the proxy database management component comprised in the second active database site further comprises:

switching, by the one or more processors, reading routine to one of the third sub-group of disks and the fourth sub-group of disks in response to not recognizing out the content errors or the abnormal status tag, the one of the third sub-group of disks and the fourth sub-group of disks having an earliest log sequence number.

\* \* \* \* \*